United States Patent [19]

Köhler et al.

[11] Patent Number: 4,952,624

[45] Date of Patent: Aug. 28, 1990

[54] POLYARYLENE SULFIDE MIXTURES WITH REDUCED RADICAL FORMATION UNDER HIGHLY ACCELERATED WEATHERING

[75] Inventors: Burkhard Köhler, Krefeld; Gerhard Heywang, Bergisch Gladbach; Eberhard Zirngiebl, Cologne, all of Fed. Rep. of Germany

[73] Assignee: Bayer Aktiengesellschaft, Leverkusen-Bayerwerk, Fed. Rep. of Germany

[21] Appl. No.: 389,267

[22] Filed: Aug. 3, 1989

[30] Foreign Application Priority Data

Aug. 16, 1988 [DE] Fed. Rep. of Germany ....... 3827644

[51] Int. Cl.$^5$ .......................... C08K 5/37; C08K 5/42; C08K 5/32; C08K 5/03
[52] U.S. Cl. .................................... 524/160; 524/260; 524/393; 524/467
[58] Field of Search ............... 524/160, 259, 260, 393, 524/467

[56] References Cited

U.S. PATENT DOCUMENTS 3,697,592 10/1972 Hall et al. ............................ 524/260
4,684,753 8/1987 Schiessler et al. ................... 570/206

OTHER PUBLICATIONS

Liebigs, Ann. Chem. 531, 2(1937).

*Primary Examiner*—Veronica P. Hoke
*Attorney, Agent, or Firm*—Connolly and Hutz

[57] ABSTRACT

The invention relates to mixtures of polyarylene sulfides (PAS), preferably polyphenylene sulfide (PPS), and pyrenes. The mixtures show reduced radical formation under highly accelerated weathering conditions (UV irradiation).

5 Claims, No Drawings

POLYARYLENE SULFIDE MIXTURES WITH REDUCED RADICAL FORMATION UNDER HIGHLY ACCELERATED WEATHERING

This invention relates to mixtures of polyarylene sulfides (PAS), preferably polyphenylene sulfide (PPS), and pyrenes. The mixtures according to the invention show reduced radical formation under highly accelerated weathering (UV irradiation).

Polyarylene sulfides and their production are known (cf. for example U.S. Pat. No. 3,354,129, EP-OS No. 171 021).

Polyarylene sulfide resins are superior to many thermoplastics in their thermal stability, solvent resistance, flame resistance and other properties. However, they show poor stability to UV radiation, particularly in the presence of oxygen. Accordingly, moldings, films and fibers of PAS for example are only suitable to a limited extent for external applications.

It is known that PPS, like other plastics, can be stabilized with at least 10% by weight carbon black (cf. for example JA-OS No. 100 139). Disadvantages of these PAS compounds include the fact that they can only be used for black-colored parts and the fact that they impair the very good electrical insulating properties of polyarylene sulfides.

It is also known that PPS can be stabilized by addition of copper(I) halides (cf. for example DE-OS No. 3 617 138). However, sulfur compounds in PPS cause color darkening with copper compounds. Nickel-containing stabilizers, such as nickel dibutyl dithiocarbamate, show similar behavior (cf. for example U.S. Pat. No. 4,413,081).

In addition, it is known that PPS can be stabilized during processing by delaying curing, for example by addition of tin carboxylates and oxides (cf. for example EP-OS No. 94 038), sterically hindered phenols (cf. for example EP-OS No. 94 092), N-acylated aminotriazoles (cf. for example EP-OS No. 94 091).

Unfortunately, these additives afford no protection against radical damage.

A direct measure of inadequate stability (bonding breaks) to UV radiation can be obtained by measuring the concentration of radicals under irradiation. No reduction in the radical forming rate was observed by this method where tetramethyl piperidines (cf. for example U.S. Pat. No. 4,370,430) were used as PPS stabilizers.

It has now been found that mixtures of polyarylene sulfides, preferably polyphenylene sulfide, with selected pyrenes show a distinctly lower radical forming rate under UV irradiation in air than unstabilized products treated in accordance with the prior art.

Accordingly, the present invention relates to mixtures of (A) 99.1 to 10% by weight polyarylene sulfides, preferably polyphenylene sulfide, (B) 0.1 to 10% by weight of a pyrene corresponding to formula (I)

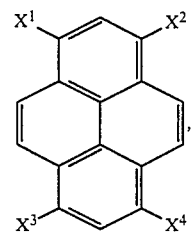

in which $X^1$–$X^4$ independently of one another represent the group —S—R, hydrogen, F, Cl, Br, I, nitro groups or sulfonic acid groups or (alkali) salts thereof (Na, K), although only two of the substituents $X^1$ to $X^4$ may be hydrogen, and R represents $C_1$–$C_{22}$ alkyl, $C_5$–$C_{22}$ cycloalkyl, $C_7$–$C_{22}$ aralkyl or alkylaryl, $C_6$–$C_{14}$. aryl, preferably phenyl; the aryl radical may optionally be substituted (for example by halogen, $C_1$–$C_4$ alkyl, etc.) and (C) optionally 0.01 to 100% by weight, based on the sum of the weight of components A+B, of other additives.

Examples of substituents R in the group —S—R are methyl, ethyl, isopropyl, n-butyl, sec-butyl, tert.-butyl, n-amyl, isoamyl, 2-ethylhexyl, dodecyl, palmityl, stearyl, cyclohexyl, benzyl, phenyl, cresyl, chlorophenyl, nitrophenyl, naphthyl.

The pyrenes suitable for use in accordance with the invention are known and may be prepared by halogenation (cf. DE-OS No. 3 532 882 corresponding to U.S. Pat. No. 4,684,753, Liebigs Ann. Chem. 531, 2 (1937)), nitration or sulfonation of pyrene.

The pyrenes containing thioether groups are prepared by reaction of 1,2,6,8-tetrahalopyrene with the corresponding mercaptides in dipolar aprotic solvents (cf. for example DE-AS No. 3 814 534).

The mixtures according to the invention may optionally contain from 0.01 to 100% by weight, based on the sum of the weight of components A+B, of standard fillers such as, for example, glass fibers, carbon fibers, talcum, calcium carbonate or calcium sulfate, etc.

The mixtures according to the invention have the advantage over unstabilized polyarylene sulfide of a lower radical forming rate (as measured by ESR at −110° C.) under irradiation with UV light (>305 nm). Accordingly, they may be processed with advantage to molded articles which are exposed to the effects of weather, such as sunlight.

EXAMPLES

COMPARISON EXAMPLE

A fused body is prepared from 10 g poly-p-phenylene sulfide having a melt viscosity of 44 Pa (306° C., 1000 s−1). Using a corundum scraper, PPS flakes are scraped off this fused body and are introduced into an ESR tube (diameter 3 mm) in which they are irradiated in air at −110° C. with a 500 watt mercury lamp of which the short-wave component (<305 nm) has been filtered out. The low temperature prevents the radicals produced by irradiation from further reacting.

The difference between the radicals formed in 60 minutes and those formed in 30 minutes is used as a measure of the radical forming rate. Difference: 182 (relative figures).

EXAMPLE 1

A fused block is prepared from 10 g PPS and 0.5 g 1,2,6,8-pyrene tetrasulfonic acid, Na₄ salt. The further procedure is then as described in the Comparison Example. Difference: 126.

EXAMPLE 2

A fused block is prepared from 10 g PPS and 0.5 g 1,3,6,8-tetrabromopyrene. The further procedure is then as described in the Comparison Example. Difference: 104.

EXAMPLE 3

A fused block is prepared from 10 g PPS and 0.5 g 1,3,6,8-tetramethyl mercaptopyrene. The further procedure is then as described in the Comparison Example. Difference: 130.

EXAMPLE 4

A fused block is prepared from 10 g PPS and 0.5 g 1,3,6,8-tetraethyl mercaptopyrene. The further procedure is then as described in the Comparison Example. Difference: 169.

EXAMPLE 5

A fused block is prepared from 10 g PPS and 0.5 g 1,3,6,8-tetraphenyl mercaptopyrene. The further procedure is then as described in the Comparison Example. Difference: 74.

EXAMPLE 6

A fused block is prepared from 10 g PPS and 0.5 g 1,3,6-tribromopyrene. The further procedure is then as described in the Comparison Example. Difference: 65.

EXAMPLE 7

A fused block is prepared from 10 g PPS and 0.5 g 1,3,6,8-tetrachloropyrene. The further procedure is as described in the Comparison Example. Difference: 134.

We claim:

1. A mixture comprising
   (A) 99.9 to 90% by weight polyarylene sulfides,
   (B) 0.1 to 10% by weight of a pyrene corresponding to formula (I)

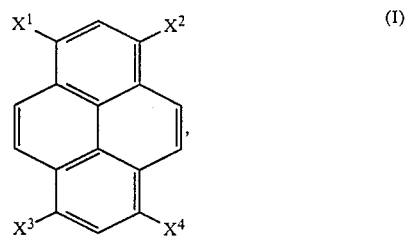

in which
$X^1$–$X^4$ independently of one another represent the group —S—R, hydrogen, F, Cl, Br, I, nitro groups or sulfonic acid groups or alkali salts thereof although only two of the substituents $X^1$ to $X^4$ may be hydrogen, and
represents $C_1$–$C_{22}$ alkyl, $C_6$–$C_{22}$ cycloalkyl, $C_7$–$C_{22}$ aralkyl or alkylaryl, substituted or unsubstituted $C_6$–$C_{14}$ aryl, 2. Mixtures as claimed in claim 1, wherein the polyarylene sulfide is poly-p-phenylene sulfide.

3. Mixtures as claimed in claim 1, wherein the pyrene is 1,3,6-tribromopyrene.

4. A mixture as claimed in claim 1 wherein the $C_6$–$C_{14}$ aryl is phenyl.

5. A molded article containing the mixture set forth in claim 1.

* * * * *